United States Patent
Kojima

(10) Patent No.: US 10,512,840 B2
(45) Date of Patent: Dec. 24, 2019

(54) PROGRAM, SYSTEM, AND METHOD FOR PROVIDING GAME

(71) Applicant: DeNa Co., Ltd., Shibuya-ku, Tokyo (JP)

(72) Inventor: Hidehito Kojima, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 16/150,109

(22) Filed: Oct. 2, 2018

(65) Prior Publication Data

US 2019/0099671 A1    Apr. 4, 2019

(30) Foreign Application Priority Data

Oct. 3, 2017   (JP) ................. 2017-193910

(51) Int. Cl.

| | | |
|---|---|---|
| A63F 13/42 | (2014.01) | |
| A63F 13/213 | (2014.01) | |
| A63F 13/837 | (2014.01) | |
| A63F 13/426 | (2014.01) | |
| G06F 3/01 | (2006.01) | |
| A63F 13/428 | (2014.01) | |

(Continued)

(52) U.S. Cl.
CPC ............ *A63F 13/42* (2014.09); *A63F 13/213* (2014.09); *A63F 13/426* (2014.09); *A63F 13/428* (2014.09); *A63F 13/837* (2014.09); *G06F 3/011* (2013.01); *G06F 3/013* (2013.01); *G06F 3/014* (2013.01); *G06F 3/016* (2013.01); *G06F 3/017* (2013.01); *G06F 3/0304* (2013.01); *G06K 9/00335* (2013.01); *G06K 9/00355* (2013.01); *G06K 9/00375* (2013.01); *A63F 2009/2435* (2013.01); *A63F 2300/1087* (2013.01); *A63F 2300/8076* (2013.01)

(58) Field of Classification Search
None
See application file for complete search history.

(56) References Cited

U.S. PATENT DOCUMENTS

| | | | |
|---|---|---|---|
| 2006/0046846 A1* | 3/2006 | Hashimoto | ............ A63F 13/10 463/36 |
| 2015/0363001 A1* | 12/2015 | Malzbender | ............ G06F 3/017 706/18 |

(Continued)

FOREIGN PATENT DOCUMENTS

| | | |
|---|---|---|
| JP | 2003-236245 A | 8/2003 |
| JP | 2011-044160 A | 3/2011 |

(Continued)

OTHER PUBLICATIONS

Office Action for related Japanese Patent Application No. 2017-193910 dated Oct. 31, 2017; 2 pages.

*Primary Examiner* — Jason T Yen
(74) *Attorney, Agent, or Firm* — Procopio, Cory, Hargreaves & Savitch LLP

(57) ABSTRACT

A player terminal pertaining to an embodiment of the present invention functions as a device that provides a game to a player. Since the player terminal is configured to determine a player's operation input on the basis of the change in the size of a figure that is moved by the player in an image inputted via an in-camera, it is possible to determine the player's operation input on the basis of a player action in which the figure is moved farther away from or closer to the in-camera.

15 Claims, 12 Drawing Sheets

(51) Int. Cl.
*G06F 3/03* (2006.01)
*G06K 9/00* (2006.01)
*A63F 9/24* (2006.01)

(56) References Cited

U.S. PATENT DOCUMENTS

| | | | | |
|---|---|---|---|---|
| 2016/0073033 A1* | 3/2016 | Ogasawara | ........... | A63F 13/428 |
| | | | | 348/207.1 |
| 2016/0232675 A1* | 8/2016 | Ogasawara | ............. | G06F 3/017 |
| 2018/0067545 A1* | 3/2018 | Provancher | ............. | G06F 3/011 |
| 2019/0230281 A1* | 7/2019 | Ohba | ................. | H04N 5/23232 |

FOREIGN PATENT DOCUMENTS

| | | | |
|---|---|---|---|
| JP | 2016-83049 A | 5/2016 |
| JP | 2016-106715 A | 6/2016 |
| JP | 2016-148901 A | 8/2016 |
| WO | 2016/208261 A | 12/2016 |

\* cited by examiner

PROGRAM, SYSTEM, AND METHOD FOR PROVIDING GAME

This application claims foreign priority under 35 USC 119 based on Japanese Patent Application No. 2017-193910, filed on Oct. 3, 2017, the contents of which is incorporated herein in its entirety by reference.

BACKGROUND

1. Field

The present invention relates to a program (e.g., non-transitory computer-readable medium including instructions to be performed on a processor), a system, and a method for providing a game.

2. Related Art

Conventionally, in a sports game that simulates a sport, for example, it is desirable to faithfully reproduce the experience of an actual player in the sport. In view of this, the following Patent Document 1, for example, discloses a golf game that makes it possible to perform shot operations that are close to shots in actual golf. More specifically, this golf game is configured so that when the player attempts to increase his power so as to prioritize the flight distance, it becomes more difficult to adjust the timing of tap operations, thereby attempting to reproduce the feel of actual golf.

PRIOR ART DOCUMENT

Patent Documents

[Patent Document 1]: Japanese Unexamined Patent Application Publication No. 2016-83049

SUMMARY

Problems to be Solved by the Invention

However, even with the above-mentioned golf game, the specific operations performed by the player are touch operations on a touch panel, so it cannot truly be said that the action of an actual golfer is being reproduced. Also, it is possible to bring the actions of the player for inputting game operations closer to the real actions involved in golf, etc., by using a game pad (game controller) or the like having a gyro sensor, etc., but this entails a special game pad or the like, and therefore is less accessible.

It is one object of an embodiment of the present invention to assist in bringing the action of the player for performing game operation inputs closer to the real actions. Other objects of embodiments of the present invention will become apparent through reference to the overall Specification.

Means for Solving the Problems

The program (e.g., non-transitory computer-readable medium including instructions to be performed on a processor) pertaining to an embodiment of the present invention is a program for providing a game, said program causing a player terminal to execute the following processing in response to being executed on the player terminal: processing to recognize a figure that is moved by a player and that is included in an image inputted via a camera provided to the player terminal, processing to track the recognized figure in the inputted image, and processing to determine an operation input by the player on the basis of at least a change in the size of the figure in the inputted image.

The system pertaining to an embodiment of the present invention is a system that comprises one or more computer processors and provides a game wherein, in response to the execution of a readable command, the one or more computer processors execute: processing to recognize a figure that is moved by a player and is included in an image inputted via a camera provided to the player terminal, processing to track the recognized figure in the inputted image, and processing to determine an operation input by the player on the basis of at least the change in the size of the figure in the inputted image.

The method pertaining to an embodiment of the present invention is a method for providing a game, which is executed by one or more computers, said method comprising: a step of recognizing the figure that is moved by a player and is included in an image inputted via a camera provided to the player terminal, a step of tracking the recognized figure in the inputted image, and a step of determining an operation input made by the player on the basis of at least the change in the size of the figure in the inputted image.

Effects of the Invention

Various embodiments of the present invention assist in bringing the actions of the player performing game operation inputs closer to the actions of a real player.

DETAILED DESCRIPTION

Embodiments of the present invention will now be described through reference to the drawings.

Figure 1:
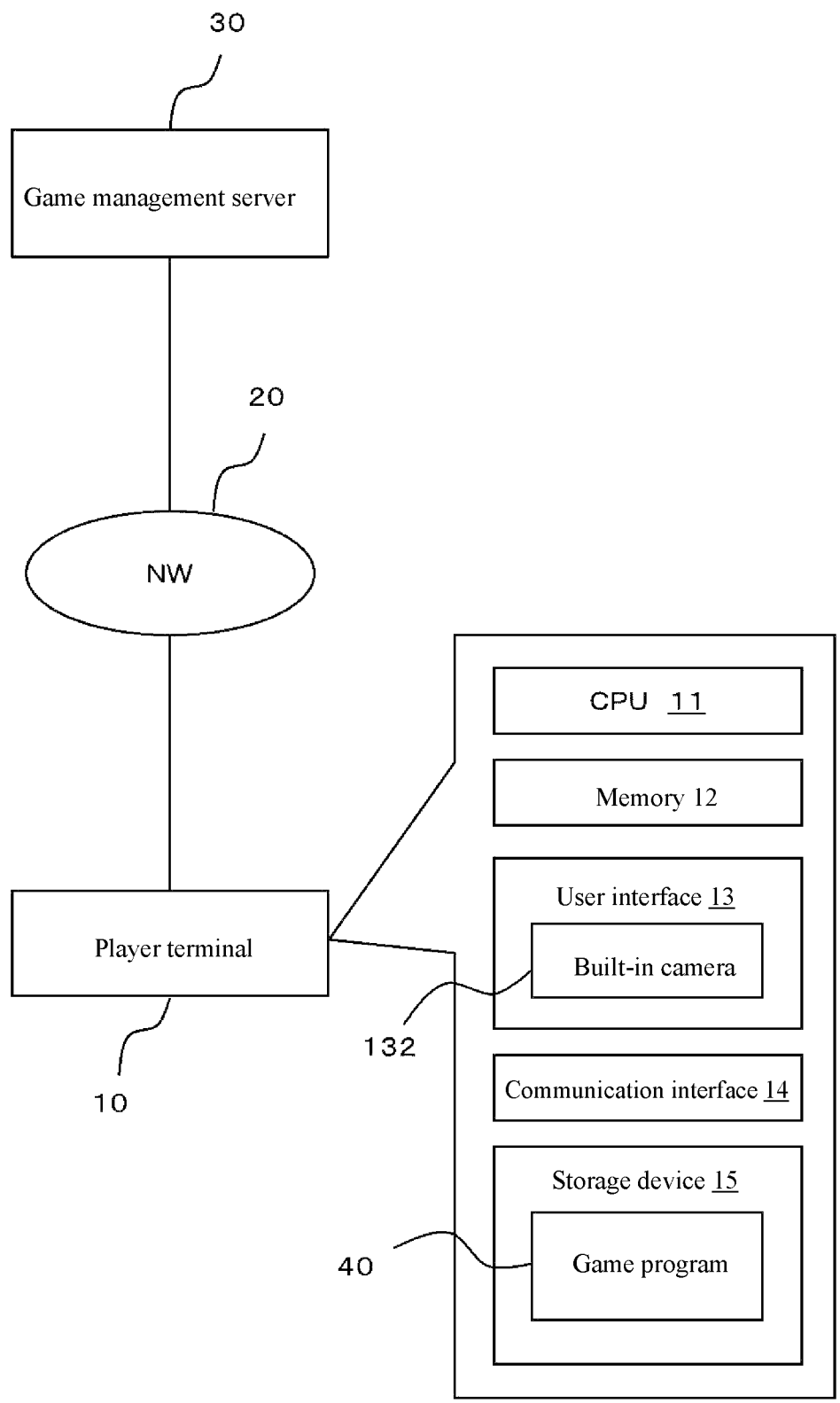
FIG. 1 is a simplified diagram of the configuration of a network including a player terminal 10 pertaining to an embodiment of the present invention.

FIG. 1 is a simplified diagram of the configuration of a network including the player terminal 10 in an embodiment of the present invention. As shown in the drawing, the player terminal 10 is communicably connected to a game management server 30 via a network 20 such as the Internet. The player terminal 10 functions as a device that provides a game to a player. The player terminal 10 is an example of a device in which some or all of the system of the present invention is installed.

The player terminal 10 is configured as an ordinary computer, and as shown in FIG. 1, comprises a CPU (computer processor) 11, a main memory 12, a user interface 13, a communication interface 14, and a storage device 15, with these constituent elements being electrically connected via a bus (not shown) or the like.

The CPU 11 reads various programs (e.g., non-transitory computer-readable medium including instructions to be performed on a processor) stored in the storage device 15 or the like into the main memory 12, and executes various commands included in the program. The main memory 12 is constituted by a DRAM or the like, for example.

The user interface 13 is any of various input/output devices for exchanging information with the user. The user interface 13 includes, for example, a keyboard, a pointing device (such as a mouse or a touch panel), an information input device such as a game pad, a voice input device such as a microphone, and an image input device such as a camera. In this embodiment, the image input device includes the built-in camera 132, which is provided so that the player operating the player terminal 10 can be imaged. Also, the user interface 13 includes an image output device (display device) such as a display, and an audio output device such as a speaker.

The communication interface 14 is made up of hardware such as a network adapter, communication software, or a combination of these, and is configured to allow wired or wireless communication via the network 20 or the like.

The storage device 15 is constituted by a magnetic disk or a flash memory, for example. The storage device 15 stores various programs (e.g., non-transitory computer-readable medium including instructions to be performed on a processor) including an operating system, various data, and the like. The programs stored in the storage device 15 can be downloaded and installed from an application market or the like. In this embodiment, the programs stored in the storage device 15 include a game program 40 pertaining to an embodiment of the present invention. The game program 40 is a program for causing the player terminal 10 to function as the device that provides a game in this embodiment.

In this embodiment, the player terminal 10 can be configured as a smartphone, a tablet terminal, a personal computer, a dedicated game terminal, or the like.

Like the player terminal 10, the game management server 30 is configured as an ordinary computer. The game management server 30 stores and manages information related to the game provided by the player terminal 10. For example, the game management server 30 manages the progress status of the game for each player (including the level of the players, information related to items possessed, and so forth), game data (such as game space data for each stage, etc.), and the like. The game management server 30 can be configured by using a plurality of server devices each configured as an ordinary computer.

For example, in response to activation of the game program 40, the player terminal 10 acquires game data and the progress status of the game of the corresponding player from the game management server 30. Also, for example, the player terminal 10 acquires game data from the game management server 30 during execution of the game program 40 (such as acquiring game data of a subsequent stage after completing a specific stage), and transmits the most recent game progress status of the player to the game management server 30.

Figure 2:
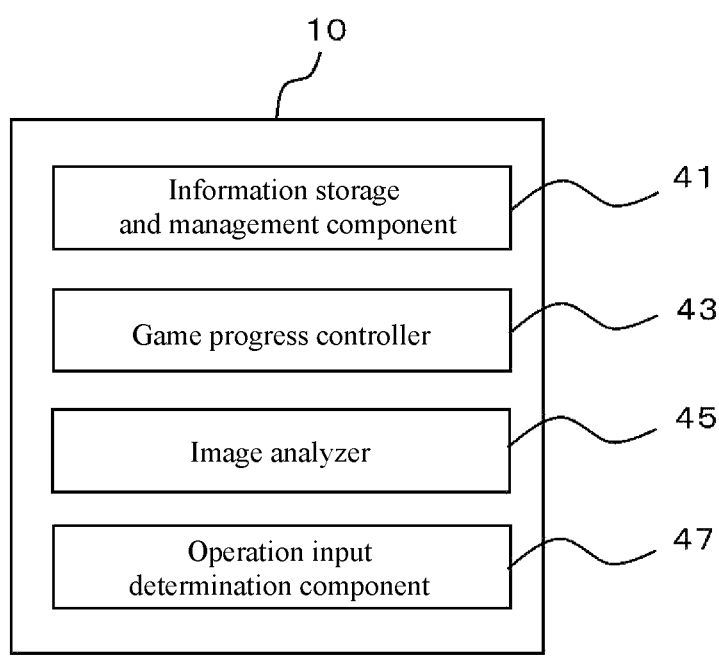
FIG. 2 is a simplified block diagram of the functions of the player terminal 10.

Next, the functions of the player terminal 10 in this embodiment will be described. FIG. 2 is a simplified block diagram of the functions of the player terminal 10. As shown in the drawing, the player terminal 10 has an information storage and management component 41 for storing and managing information, a game progress controller 43 for controlling the progress of the game, an image analyzer 45 for analyzing images inputted via the built-in camera 132, and an operation input determination component 47 for determining an operation input by the player. These functions are realized by cooperatively operating hardware such as the CPU 11 and the main memory 12, and various programs (including the game program 40), data, and so forth stored in the storage device 15. For example, they are realized by having the CPU 11 execute a command included in a program (e.g., non-transitory computer-readable medium including instructions to be performed on a processor) read into the main memory 12. Some or all of the functions shown in FIG. 2 can be realized by cooperation between the player terminal 10 and the game management server 30, or can be realized by the game management server 30 alone.

The information storage and management component 41 stores and manages various kinds of information in the storage device 15 and the like. The game progress controller 43 executes various kinds of processing related to the control of game progress. For example, the game progress controller 43 executes various kinds of processing for advancing the game on the basis of the player operation input determined by the operation input determination component 47. The game progress controller 43 is configured to control the display of the game screen according to the progress of the game.

The image analyzer 45 executes various kinds of processing related to analysis of the images inputted via the built-in camera 132. In this embodiment, the image analyzer 45 is configured to recognize a figure included in an image inputted via the built-in camera 132. This figure is one that is moved by the player and may include, for example, a part of a human body (such as a hand), an article held by the player, or the like. Processing to recognize the figure included in an image can be realized by applying a known image recognition technique, such as by using a learned model obtained by machine learning.

Also, in this embodiment, the image analyzer 45 is configured to track the recognized figure in the image inputted via the built-in camera 132. The processing for tracking a figure in an image can be realized by applying a known figure tracking technique.

The operation input determination component 47 executes various kinds of processing related to determination of an operation input by the player. In this embodiment, the operation input determination component 47 is configured to determine operation input on the basis of at least the change in the size of the figure in the image inputted via the built-in camera 132. The size of a figure is determined by the image analyzer 45 that tracks the figure, for example, and the operation input determination component 47 can be configured to identify a change in size on the basis of the size of the figure determined by the image analyzer 45. The operation input determination component 47 can also be configured to be able to determine operation input on the basis of a touch operation or the like on the touch panel provided on the player terminal 10, in addition to determining operation input on the basis of the image inputted via the built-in camera 132.

Thus, the player terminal 10 in this embodiment is configured to determine an operation input by the player on the basis of the change in the size of the figure that is moved by the player in an image inputted via the built-in camera 132. A change in the size of this figure can be said to be a change in the distance between the figure and the built-in camera 132, so the player terminal 10 can determine the player's operation input on the basis of the action of the player, that is, whether the player moves the figure away from the built-in camera 132 or closer to the built-in camera 132. This method for determining the operation input can assist in bringing the action of the player for performing game operation inputs closer to real actions.

In this embodiment, the operation input determination component 47 can be configured to determine the player's operation input on the basis of not only the change in size, but also at least the change in the shape of the figure in the image inputted via the built-in camera 132. The change in the shape of the figure is determined, for example, by the image analyzer 45 that tracks the figure. This determination can be accomplished by applying a known image recognition technique, such as by using a learned model obtained by machine learning. For example, the operation input determination component 47 is configured to determine a first type of operation input on the basis of the change in the size of the figure, and to determine a second type of operation input on the basis of the change in the shape of the figure. More specifically, for example, the image analyzer 45 can be configured to recognize a figure of a first shape and to track this figure, and determine a change in the shape of the tracked figure from the first shape to a second shape, and the operation input determination component 47 can be configured to determine a first type of operation input on the basis of the change in the size of a figure of a first shape, and to determine a second type of operation input according to a change in the shape of the figure from a first shape to a second shape. Such a configuration makes it possible to determine the operation input on the basis of the change in the shape of the figure (such as the shape, position, etc., of the player's hand), and as a result, can assist in making the actions of the player in performing game operation inputs more like real actions.

Also, the image analyzer 45 can be configured to track the area in which the figure is present in the image inputted via the built-in camera 132, and analyze the image within a range based on this area (such as within a range that is the same as the area, or within a range of this area and its surroundings), thereby determining the change in the shape of the figure. For example, the image analyzer 45 is configured to track the area in which a figure of a first shape is present in the image inputted via the built-in camera 132, and analyze the image within a range based on this area, thereby determining the change in the shape of the figure from a first shape to a second shape. In such a configuration, since the image analysis for determining the change in the shape of the figure is performed only within a range based on the area in which the figure is present, the processing load of the image analysis is lighter than when the entire area of the inputted image is subjected to image analysis.

In this embodiment, the game progress controller 43 can be configured to dispose on the game screen a first object whose appearance changes according to the change in the size of the figure, in response to the recognition of the figure included in the image inputted via the built-in camera 132. For example, the game progress controller 43 is configured to dispose the first object at a specific position on the game screen when the image analyzer 45 has recognized the figure. Such a configuration makes it possible to apprise the player that a figure has been recognized and of a change in the size of the figure (that is, a change in the distance between the figure and the in-camera 132), via the first object disposed on the game screen.

There are no particular restrictions on the game in this embodiment, which can include various kinds of games. For instance, the game in this embodiment encompasses games in which a player (player character) releases an item (such as a projectile or an arrow) in a virtual game space to hit a mark (such as a target or an enemy character), examples of which include slingshot (rubber band gun, pachinko) games, archery games, dart games, and various shooting games similar to these.

In this embodiment, the first object can be configured to become smaller while rotating as the figure in the image inputted via the in-camera 132 becomes smaller. For example, the game progress controller 43 is configured to rotate the first object while reducing its size on the game screen, in conjunction with a decrease in the size of the figure, on the basis of the size of the figure determined by the image analyzer 45. In this configuration, as the figure moves away from the in-camera 132, the first object rotates while becoming smaller, and this assists in giving a realistic rendering on the game screen of the real action of a player who is pulling back on a projectile or the like while aiming at a target.

Also, the game progress controller 43 can be configured to dispose on the game screen a second object that has substantially the same shape as that of the first object and is smaller than the first object when the first object is disposed on the game screen, and to display an enlarged view of at least part of the game space included in the game screen when the first object becomes smaller and overlaps with the second object as the figure becomes smaller. The first and second objects can be configured to have a frame shape (such as an annular shape), for example, in which case an enlarged view of part of the game space is displayed in the area within the frame of the frame-shaped first and second objects, in response to the first object overlapping with the second object. With such a configuration, overlapping the first and second objects makes it possible for an enlarged view of at least part of the game space to be displayed, such as displaying an enlarged view of a target disposed in the game space (which ends up being advantageous to the player), and this improves the game experience with respect to the action of pulling back on an item such as a projectile. In this case, the second object can be configured to rotate in the opposite direction from the direction of rotation of the first object as the figure becomes smaller. Such a configuration helps to more realistically depict on the game screen the player's action of aiming at a target.

Also, the operation input determination component 47 can be configured to determine an operation input for the player to release an item on the basis of at least a change in the shape of the figure in the image inputted via the in-camera 132. For example, the image analyzer 45 can be configured to recognize a figure having a first shape (such as a hand in a position of gripping a projectile or an arrow) included in an image inputted via the in-camera 132, track a figure of this first shape, and determine a change in the shape of the tracked figure from a first shape to a second shape (such as a position in which a projectile or arrow has been released), and the operation input determination component 47 can be configured to determine that an operation input to release an item has been performed when the image analyzer 45 has determined a change in the shape of the figure from a first shape to a second shape. Such a configuration makes it possible to determine an operation input to release an item on the basis of a change in the shape of the figure, and as a result, this helps to bring a player action for performing a game operation input, such as releasing a projectile or the like and hitting a target, closer to a real action of releasing an item.

Also, the operation input determination component 47 can be configured to set the strength at which the player releases an item on the basis of the difference between the size of a figure when that figure has been recognized as being included in the image inputted via the in-camera 132, and the size of the figure immediately before determining the operation input for the player to release an item (such as the difference between the size of the figure when a figure of a first shape has been recognized and the size of the figure of the first shape immediately before the shape of the figure changes to a second shape). For example, the operation input determination component 47 is configured to compare the size of a figure when that figure has been recognized, and set the strength at which the item is released higher in proportion to how much smaller the figure has become immediately before determining the operation input to release the item. In such a configuration, the strength at which an item is released is set on the basis of the movement distance of the figure with respect to the in-camera 132 from the time when the figure is recognized until the action corresponding to the operation input to release the item is performed, which helps to make the user experience in slingshot games and archery games more realistic.

In this embodiment, the game progress controller 43 can be configured to set the upper limit to the strength at which the player releases an item (the movement distance of the figure with respect to the in-camera 132 from the time the figure has been recognized until the time an action corresponding to an operation input to release the item is performed), in which case the first object can be configured such that the lower the upper limit value is set, the higher (faster) is the speed at which the first object becomes smaller while rotating as the figure becomes smaller. The upper limit value of the strength at which the item is released can vary with the level of the player and the type of item being used (including projectiles and arrows), for example. Such a configuration makes it possible to make the size of the first object the same when the movement distance of the figure has reached the upper limit value, regardless of the upper limit value of the strength at which the item is released.

Next, a specific example of the player terminal 10 in this embodiment having these functions will be described. The game in this example is a slingshot game in which a player releases a projectile in a virtual game space to hit a target, and is mainly played using a player terminal 10 small enough that a player can hold it in one hand (a smart phone or the like).

Figure 3:
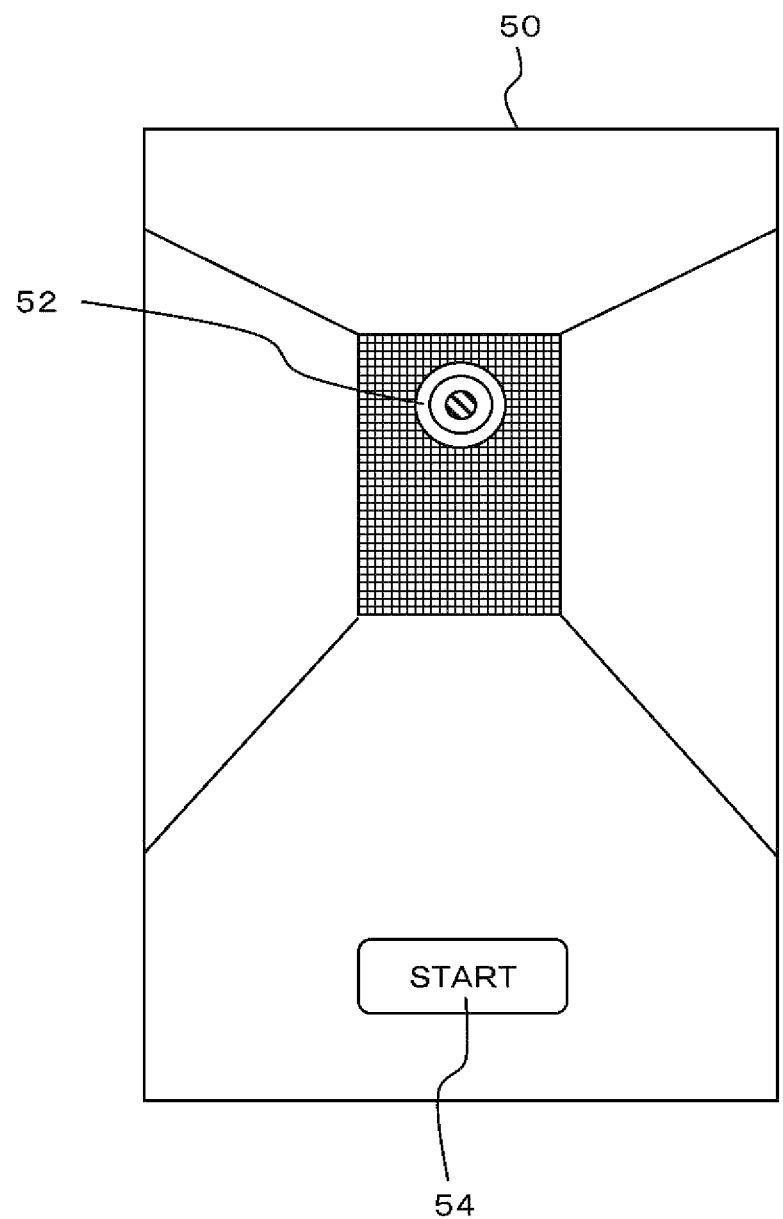
FIG. 3 is a diagram illustrating a game screen 50.

FIG. 3 shows an example of a game screen 50 of a slingshot game displayed on the player terminal 10. The game screen 50 displays part of the virtual game space on the entire screen area, and a target object 52 is disposed in the game space. Also, the game screen 50 in FIG. 3 corresponds to the state before the player starts a series of actions for releasing projectiles, and a start button 54 displayed as "START" is disposed at the bottom of the screen.

The game screen 50 is configured so that the portion of the game space displayed on the entire screen area (which can also be referred to as the field of view of the player in the game space or the direction of the line of sight) is changed by moving the player terminal 10. This change in the field of view in the game space corresponding to the movement of the player terminal 10 is accomplished by using a gyro sensor or the like provided in the player terminal 10.

Figure 4:
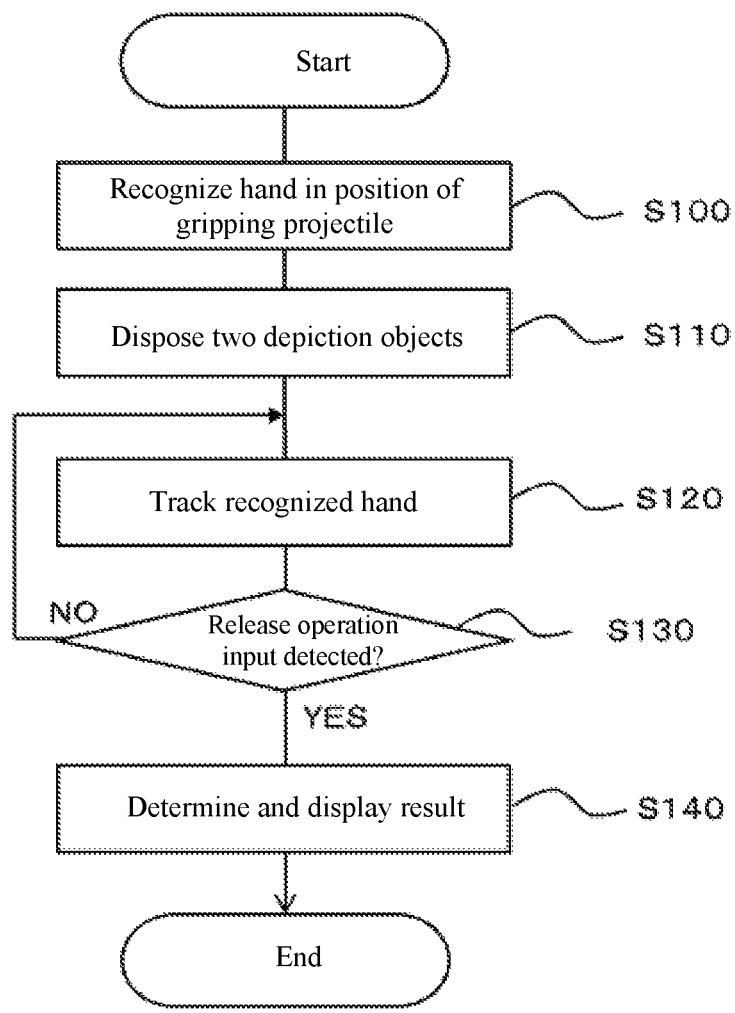
FIG. 4 is a flowchart illustrating the processing executed by the player terminal 10.

FIG. 4 is a flowchart illustrating the processing executed by the player terminal 10 in response to selection by the player of the start button 54 (such as selection by a tap operation). When the start button 54 is selected, as shown in the drawing, the player terminal 10 first recognizes a hand that is included in the image inputted via the in-camera 132 in a position of gripping a projectile (first shape) (S100).

Figure 5:
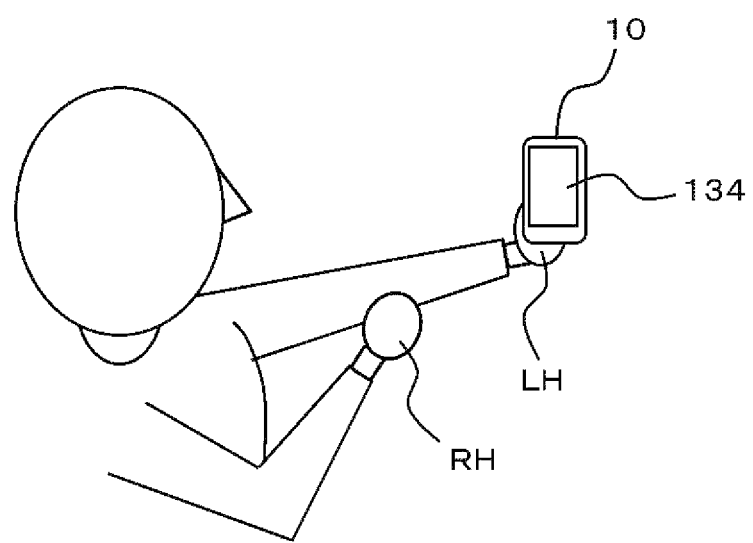
FIG. 5 is a diagram illustrating an example of the posture of a player.

FIG. 5 is a diagram illustrating an example of the posture of a player when playing the slingshot game of this example. As shown in the drawing, the player holds the player terminal 10 in one hand (the left hand LH in the example of FIG. 5) so that a display 134 of the player terminal 10 is in front. Then, while looking at the game screen 50 displayed on the display 134, the player assumes that the player terminal 10 is the slingshot main body, and with the other hand (the right hand RH in the example of FIG. 5) performs an action on the projectile loaded in the slingshot (pulls it toward himself and then lets go). The posture of the player shown in FIG. 5 corresponds to a state in which the player uses his right hand to grip the projectile loaded in the slingshot, and has not yet started pulling back. After selecting the start button 54, the player assumes the posture shown in FIG. 5.

Figure 6:
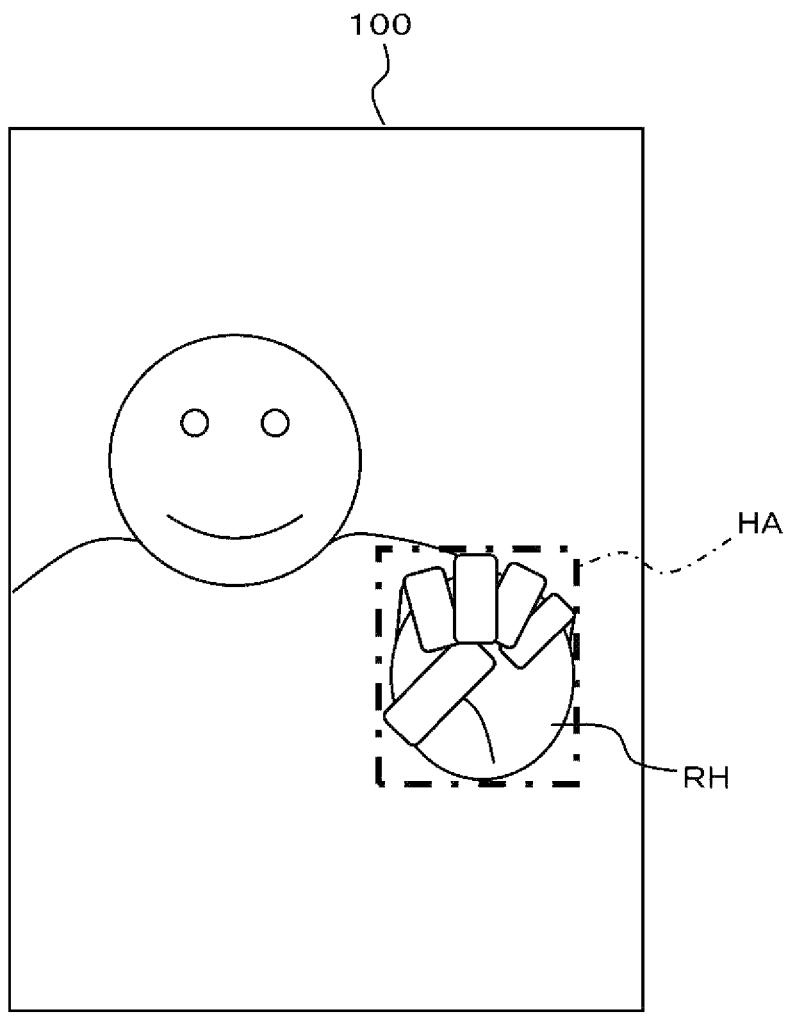
FIG. 6 is a diagram illustrating an image 100 inputted via a built-in camera 132.

FIG. 6 shows an example of the image 100 inputted via the in-camera 132 in the posture of the player illustrated in FIG. 5 (the state before the player starts pulling). The in-camera 132 is provided so as to provide a field of view on the display 134 side of the player terminal 10, and as shown in FIG. 6, the image 100 includes the player in a posture of using his right hand RH to grip a virtual projectile loaded in a virtual slingshot. In S100 of the flowchart of FIG. 4, the entire area of the image 100 is analyzed to recognize a hand in a posture of gripping a projectile. This recognition of a hand in a specific position in the image is accomplished by using a learned model obtained by machine learning with a large number of images of hands in specific positions serving as teacher data.

Also, in this example, when recognizing a hand in a position of gripping a projectile, a hand area HA in which the hand is present is specified. In this example, as shown in FIG. 6, the hand area HA is specified as a rectangular area substantially contiguous with the outline of the area recognized as a hand in a position of gripping a projectile.

Also, in this example, when recognizing a hand in a position of gripping a projectile, any face included in the image inputted via the in-camera 132 is excluded from hand recognition, which prevents the erroneous recognition of the player's face as a hand.

Figure 7:
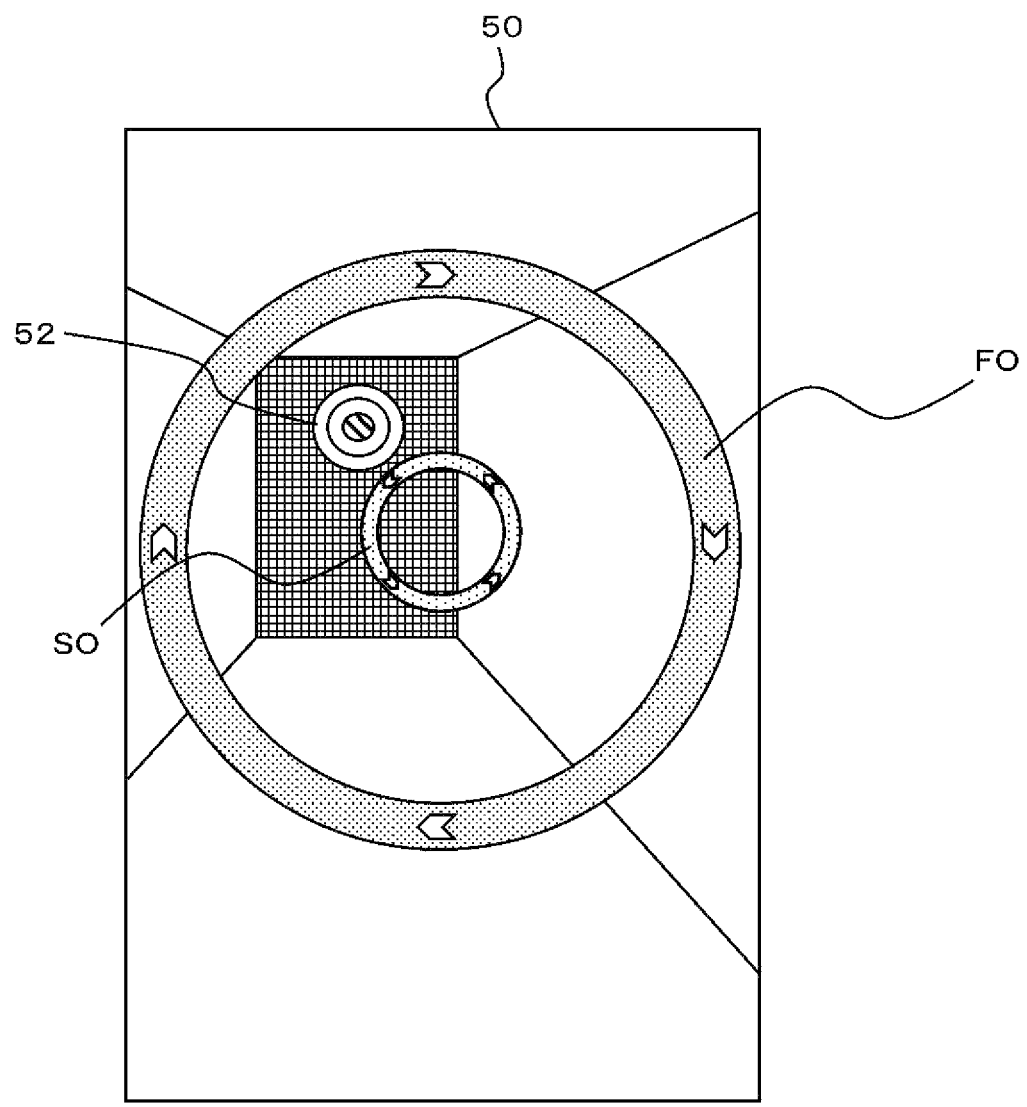
FIG. 7 is a diagram illustrating the game screen 50 when two depiction objects FO and SO are disposed.

Going back to the flowchart in FIG. 4, once a hand in a position of gripping a projectile is recognized, the player terminal 10 then disposes two depiction objects on the game screen 50 (S110). FIG. 7 shows an example of the game screen 50 when two depiction objects FO and SO are disposed. As shown in the drawing, the two depiction objects FO and SO have the same center (a position that is slid slightly upward from the center of the screen 50) and have annular shapes of different diameters. The outer depiction object FO (first object) has a diameter approximately three times that of the inner depiction object SO (second object).

The depiction objects FO and SO are disposed on the game screen 50 independently of the game space. In other words, even if the player's field of view changes in the game space because the player terminal 10 is moved, the positions of the depiction objects FO and SO on the game screen 50 do not change.

Going back to the flowchart in FIG. 4, the player terminal 10 then tracks the recognized hand in the image inputted via the in-camera 132 until a release operation input by the player (an operation input to release the projectile) is detected (S120 and No in S130). This tracking of an item (hand) in the image is accomplished by using a known tracking technique, such as by applying a tracking algorithm or the like based on the mean shift method, for example.

Figure 8:
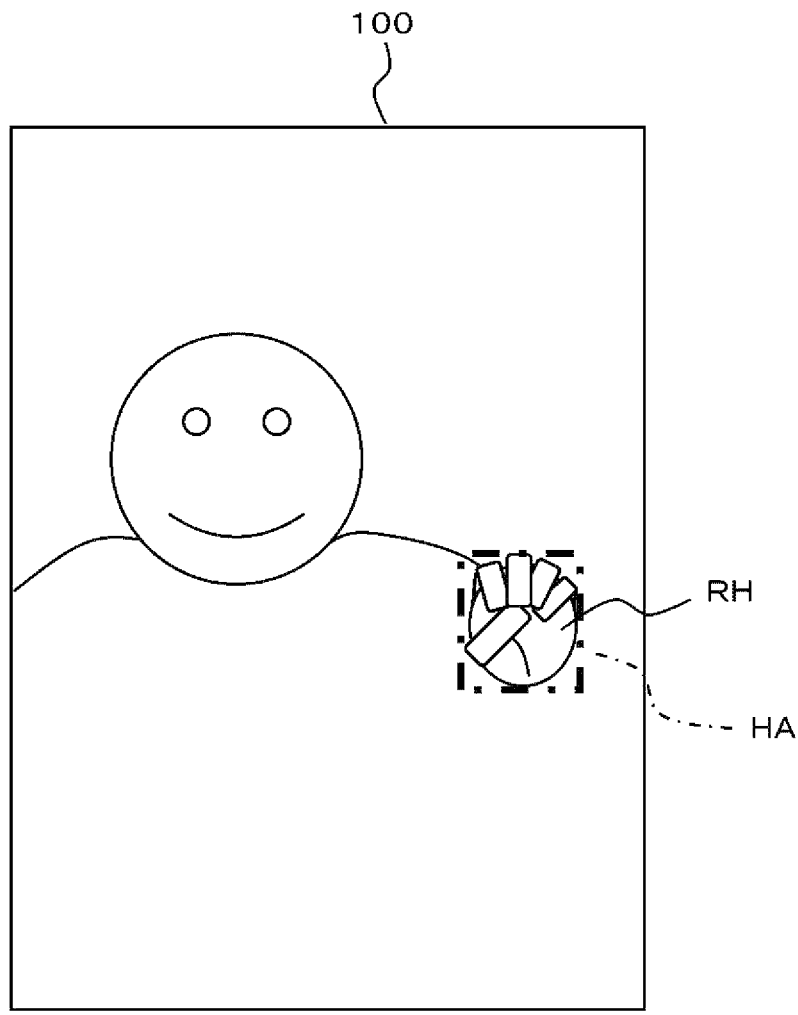
FIG. 8 is a diagram illustrating the image 100 inputted via the built-in camera 132.

FIG. 8 is an example of the image 100 inputted via the in-camera 132, and corresponds to a state in which the player has moved his right hand RH toward himself from the state in FIG. 6. The action of moving his hand toward himself corresponds to the action of pulling back the projectile from a state of gripping the projectile loaded in the slingshot. As shown in FIG. 8, when the hand of the player moves toward the player, it moves away from the in-camera 132, so the right hand RH in the image 100 becomes smaller. As a result, the hand area HA specified as the area in which the hand is present also becomes smaller.

Figure 9:
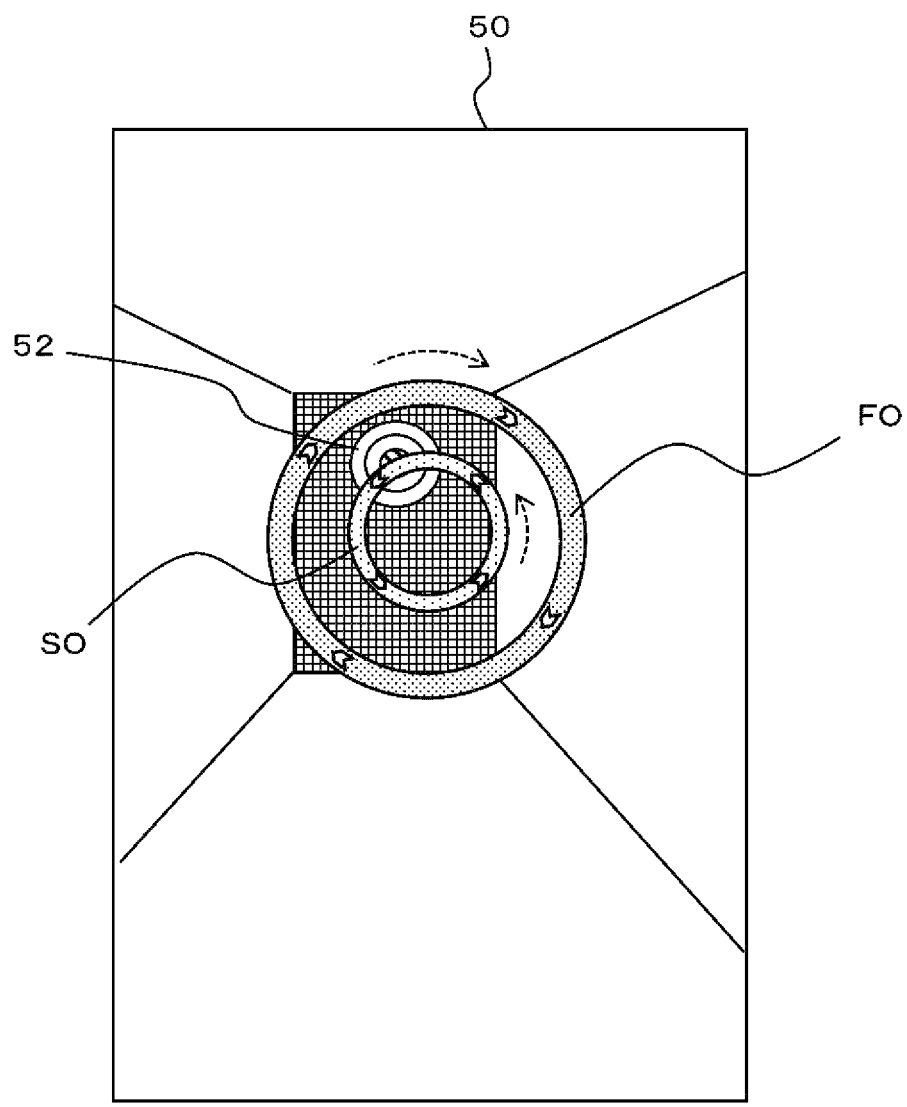
FIG. 9 is a diagram illustrating the game screen 50 when the player has moved his hand toward himself.

The outer depiction object FO disposed on the game screen 50 becomes smaller while rotating as the player's hand (hand area HA) in the image 100 becomes smaller. FIG. 9 shows an example of the game screen 50 when the player moves his hand toward himself. As shown in the drawing, as the player's hand becomes smaller in the image 100 (that is, the hand moves away from the in-camera 132), the outer depiction object FO continuously decreases from its size when it was first disposed (upon recognition of a hand in a position of gripping a projectile). Also, when the outer depiction object FO continuously decreases in size, it rotates clockwise without changing its center. On the other hand, the inner depiction object SO rotates counterclockwise without changing its center in conjunction with the rotation of the outer depiction object FO, but its size does not change. These actions of the depiction objects FO and SO realistically depict on the game screen 50 an action of aiming at a target while pulling back a projectile.

Figure 10:
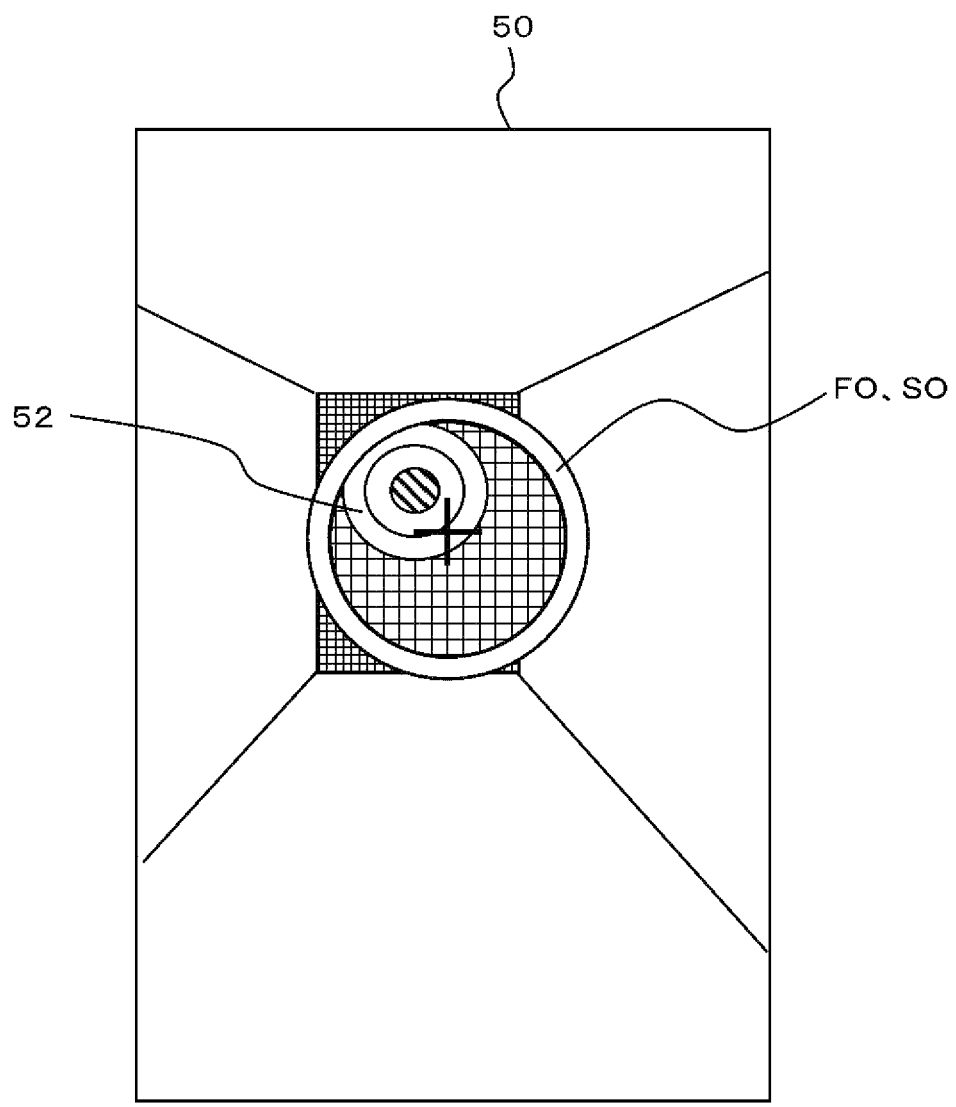
FIG. 10 is a diagram illustrating the game screen 50 in concentration mode.

In addition, in this example, when the outer depiction object FO becomes smaller and overlaps (becomes the same size as) the inner depiction object SO, the display of the game screen 50 switches to concentration mode. FIG. 10 shows an example of the game screen 50 in concentration mode. As shown in the drawing, in concentration mode, the sizes of the overlapping depiction objects FO and SO are larger than the normal size of the inner depiction object SO (the diameter is about twice as large). The sizes of the overlapping depiction objects FO and SO need not be changed in concentration mode (that is, the normal size of the inner depiction object SO may be left as it is).

In concentration mode, the game space display is enlarged in the area within the annular depiction objects FO and SO, and a cross is displayed in the center thereof. The player can enlarge the display of the target object 52 by moving the player terminal 10 so that the target object 52 is included in the area within the depiction objects FO and SO, and this cross can be used for better aim. In concentration mode, when the player moves his hand that is gripping a virtual projectile so that the overlapping state of the depiction objects FO and SO is eliminated, the concentration mode ends.

This depiction using the depiction objects FO and SO corresponding to the change in the size of the hand being tracked is performed until a release operation input is detected (Yes in S130). In this example, the release operation input is detected by determining that the hand being tracked has changed to being open.

Figure 11:
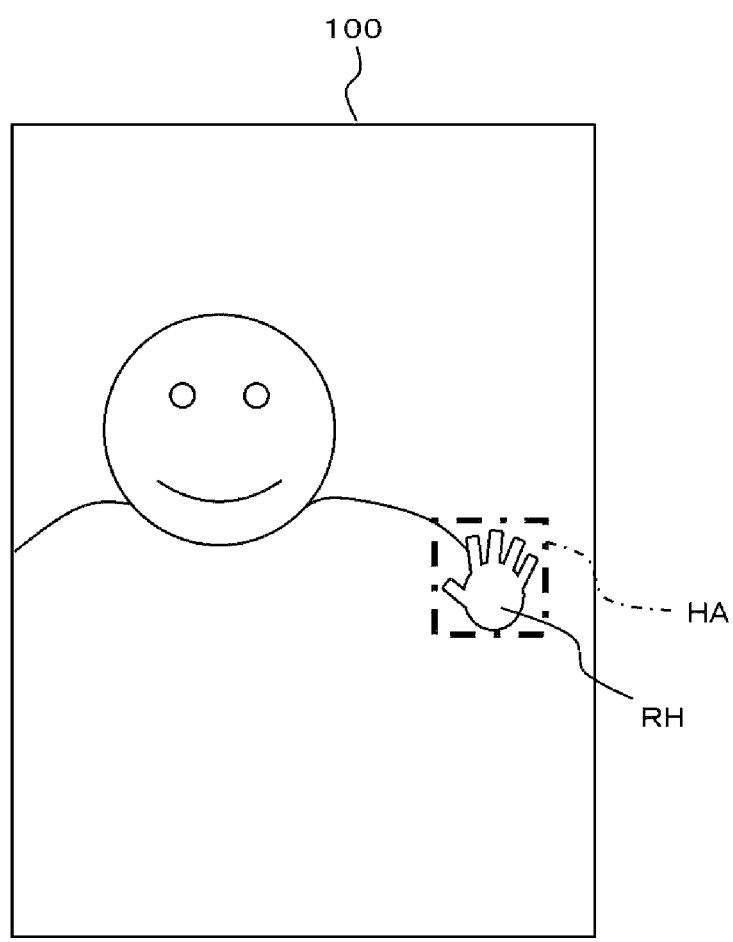
FIG. 11 is a diagram illustrating the image 100 inputted via the built-in camera 132.

FIG. 11 shows an example of the image 100 inputted via the in-camera 132, and corresponds to a state in which the player's right hand RH is open. The action of opening the hand corresponds to the action of releasing the projectile being gripped. In S130 in the flowchart of FIG. 4, of the entire area of the image 100, the hand area HA being tracked is analyzed to recognize a hand in an open state (to determine that the hand has changed to an open state). As described above, this recognition of a hand in a specific position in the image is accomplished by using a learned model obtained by machine learning using a large number of images of specific positions as teacher data.

When a release operation input is detected, the player terminal 10 then determines and displays the shot result of the released projectile (S140). More specifically, the impact position is determined on the basis of the direction in the game space in which the player released the projectile (that is, the orientation of the player terminal 10 when the release operation input was detected), and how far back the player pulled the projectile (that is, the difference between the size of the hand (the hand area HA) at the time of recognition of a hand in a position of gripping a projectile and the size of the hand (the hand area HA) immediately before the release operation input was detected), and a depiction of the projectile being released at the determined impact position is displayed on the game screen. For example, the farther back the player pulls the projectile, the greater is the force with which the projectile is released, and the closer is the impact position to the position of the cross in concentration mode. The determination and display of the shot result of the released projectile are similarly performed when a release operation input is detected in a state that is not in concentration mode (a state before the depiction objects FO and SO overlap, or a state after the overlapping state is eliminated). If the hand being tracked goes out of the field of view of the in-camera 132 before a release operation input is detected, the flow goes back to processing to recognize a hand in a position of gripping a projectile (S100). In the display depicting how the projectile is released, the depiction may be such that the virtual projectile hits after entering the display 134 (such as a depiction in which an animation effect, such as when the entire game screen 50 shakes, is added immediately before the projectile hits). Furthermore, in response to the detection of a release operation input, the player terminal 10 may be vibrated by the operation of a vibration motor or the like, by the output of heavy bass through a speaker, or the like. This allows the player to experience the firing of the projectile more viscerally.

Thus, the game in this example can be played by operation input based on actions that are close to the real action of using a slingshot, and a user experience similar to a game featuring VR technology in which HMD or the like is used can be easily played with just a smartphone or other such player terminal 10.

Figure 12:
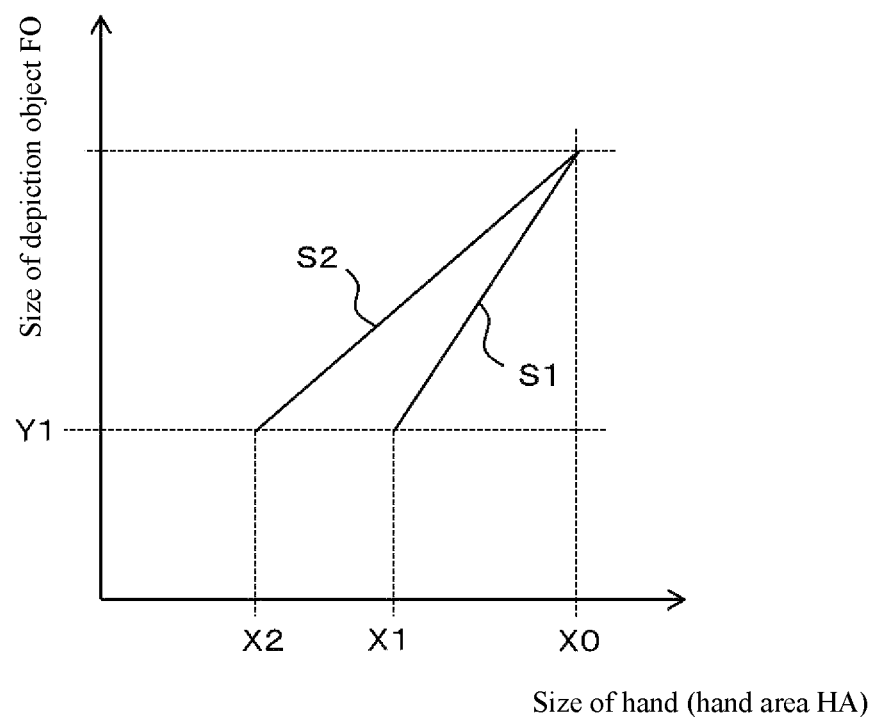
FIG. 12 is a graph of the correlation between the size of the hand size and the size of the depiction object FO.

In the above example, an upper limit value corresponding to the player level or the like may be set for the movement distance of the hand in an action in which the player pulls back the projectile. FIG. 12 is a graph of the correlation between the size of the hand in the image inputted via the in-camera 132 and the size of the outer depiction object FO. In FIG. 12, the line segment S1 corresponds to a case in which the upper limit value of the movement distance of the hand corresponds to "X0-X1," and the line segment S2 corresponds to a case in which the upper limit value of the movement distance of the hand corresponds to "X0-X2," which is greater than "X0-X1." As shown in the drawings, when there are two different upper limit values for the movement distance of the hand, the degree of change in the size of the depiction object FO with respect to the change in the size of the hand (the slope of the line segments S1 and S2) is different so that the size (Y0) of the depiction object FO upon recognition of a hand in a position of gripping a projectile becomes the same as the size (Y1) of the depiction object FO when the movement distance of the hand has reached the upper limit value. More specifically, when the line segment S1 corresponding to when the upper limit value is small is compared to the line segment S2 corresponding to when the upper limit value is large, the slope at which the depiction object FO becomes smaller increases (the faster the speed at which the depiction object becomes smaller) as the hand becomes smaller. As a result, the same depiction is possible using the depiction objects FO and SO, regardless of the set upper limit value. In addition, if the size of the hand (X0 in FIG. 12) upon recognition of a hand in a posture of gripping a projectile is excessively small (too far away from the in-camera 132), it will be difficult for the player to pull back by the time the movement distance of the hand reaches the upper limit value, so the recognition is canceled when the size of the hand upon recognition (X0 in FIG. 12) is at or below a specific threshold value, and the player may be prompted via the game screen 50 to move his hand closer to the in-camera 132.

In the above example, the player may be allowed to select the projectile to be used from among a plurality of projectiles owned by the player. In this case, the projectiles can be configured to have characteristics according to their type (for example, one is advantageous for a specific kind of target).

The player terminal 10 in this embodiment described above is configured to determine a player's operation input (such as the movement distance of the hand in the action of pulling back the projectile) on the basis of the change in size of a figure that is moved by the player (such as the player's hand) in an image inputted via the in-camera 132, so it is possible to determine the player's operation input on the basis of the player's action, that is, whether the figure moves away from the in-camera 132 or moves closer to the in-camera 132. This method for determining an operation input can assist in making the action of the player in performing game operation inputs more like real actions.

In another embodiment of the present invention, the information managed by the game management server 30 can be managed at the player terminal 10, and the function of the game management server 30 can be integrated into the player terminal 10.

The processing and procedures described in this Specification may be implemented by software, hardware, or any combination thereof, besides what was explicitly described above. For example, the processing and procedures described in this Specification may be implemented by installing logic corresponding to the processing and procedures in a medium such as an integrated circuit, volatile memory, nonvolatile memory, magnetic disk, or the like. Also, the processing and procedures described in this Specification can be implemented as computer programs (e.g., non-transitory computer-readable medium including instructions to be performed on a processor) corresponding to the processing and procedures, and can be executed by various kinds of computer.

Although the processing and procedures described in this Specification are described as being executed by a single device, software, component, or module, such processing or procedures may be performed by multiple devices, multiple pieces of software, multiple components, and/or multiple modules. Also, the software and hardware elements described in this Specification can be realized by consolidating them into fewer elements, or by breaking them up into more components.

In this Specification, whether or not the constituent elements of the invention are described as being either singular or plural, the constituent elements may be either singular or plural, except when it should be understood otherwise from the context.

DESCRIPTION OF THE REFERENCE NUMERALS

10 Player terminal
20 Network
30 Game management server
41 Information storage and management component
43 Game progress controller
45 Image analyzer
47 Operation input determination component
50 Game screen
HA Hand area
FO Outer depiction object (first object)
SO Inner depiction object (second object)

The invention claimed is:

1. A non-transitory computer-readable medium including instructions to be performed on a processor for providing a game, said instructions causing a player terminal to execute processing in response to being executed on the player terminal, the instructions comprising:
   processing to recognize a figure that is moved by a player and that is included in an image input via a camera provided to the player terminal;
   processing to track the recognized figure in the inputted image; and
   processing to determine the player's operation input on the basis of at least a change in the size of the figure in the inputted image;
   wherein the player terminal is further caused to execute processing to control the display of the game screen, and the processing to control the display of the game screen includes disposing on the game screen a first object whose appearance changes according to a change in the size of the figure included in the inputted image in response to the recognition of the figure;
   wherein the game is a game in which the player releases an item in an imaginary game space to hit a target, and the first object is configured to become smaller while rotating as the figure becomes smaller;
   wherein processing to control the display of the game screen includes disposing on the game screen a second object that has substantially the same shape as that of the first object and is smaller than the first object when the first object is disposed, and enlarging the display of at least part of the game space included in the game screen when the first object becomes smaller and overlaps with the second object as the figure becomes smaller.

2. The non-transitory computer-readable medium according to claim 1, wherein the second object is configured to rotate in the opposite direction from the direction of rotation of the first object as the figure becomes smaller.

3. The non-transitory computer-readable medium according to claim 1, wherein processing to recognize the figure includes recognizing the figure of the first shape, processing to track the figure includes tracking the figure of the first shape, and processing to determine the operation input includes determining an operation input for the player to release an item on the basis of at least a change in the shape of the figure in the inputted image from the first shape to the second shape.

4. The non-transitory computer-readable medium according to claim 3, wherein processing to determine the operation input includes setting the strength at which the player releases the item on the basis of the difference between the size of the figure when the figure has been recognized and the size of the figure immediately before determining the operation input for the player to release the item.

5. The non-transitory computer-readable medium according to claim 4, wherein the at upper limit is set for the strength at which the player releases the item, and the first object is configured so that the lower the upper limit is, the faster is the speed at which the first object becomes smaller while rotating as the figure becomes smaller.

6. The non-transitory computer-readable medium according to claim 1, wherein processing to recognize the figure includes recognizing the figure of the first shape, processing to track the figure includes tracking the figure of the first shape, and processing to determine the operation input includes determining an operation input by the player on the basis of at least a change in the shape of the figure in the inputted image from the first shape to the second shape.

7. The non-transitory computer-readable medium according to claim 6, wherein processing to track the figure includes tracking an area in which the figure of the first shape is present in the inputted image, and analyzing the image within a range based on this area, thereby determining the change in the shape of the figure from the first shape to the second shape.

8. A system for providing a game, comprising one or more computer processors, wherein, in response to the execution of a readable command, the one or more computer processors execute:
processing to recognize a figure that is moved by a player and is included in an image inputted via a camera provided to the player terminal;
processing to track the recognized figure in the inputted image;
processing to determine the player's operation input on the basis of at least the change in the size of the figure in the inputted image;
processing to control a display of a game screen of the game including disposing on the game screen a first object whose appearance changes according to a change in the size of the figure included in the inputted image in response to the recognition of the figure;
wherein the game is a game in which the player releases an item in an imaginary game space to hit a target, and the first object is configured to become smaller while rotating as the figure becomes smaller;
wherein processing to control the display of the game screen includes disposing on the game screen a second object that has substantially the same shape as that of the first object and is smaller than the first object when the first object is disposed, and enlarging the display of at least part of the game space included in the game screen when the first object becomes smaller and overlaps with the second object as the figure becomes smaller.

9. A method for providing a game, which is executed by one or more computers, said method comprising:
recognizing the figure that is moved by a player and is included in an image inputted via a camera provided to the player terminal;
tracking the recognized figure in the inputted image;
determining the player's operation input on the basis of at least the change in the size of the figure in the inputted image;
controlling a display of a game screen of the game including disposing on the game screen a first object whose appearance changes according to a change in the size of the figure included in the inputted image in response to the recognition of the figure;
wherein the game is a game in which the player releases an item in an imaginary game space to hit a target, and the first object is configured to become smaller while rotating as the figure becomes smaller;
wherein processing to control the display of the game screen includes disposing on the game screen a second object that has substantially the same shape as that of the first object and is smaller than the first object when the first object is disposed, and enlarging the display of at least part of the game space included in the game screen when the first object becomes smaller and overlaps with the second object as the figure becomes smaller.

10. A non-transitory computer-readable medium including instructions to be performed on a processor for providing a game, said instructions causing a player terminal to execute processing in response to being executed on the player terminal, the instructions comprising:
processing to recognize a figure that is moved by a player and that is included in an image input via a camera provided to the player terminal;
processing to track the recognized figure in the inputted image; and
processing to determine the player's operation input on the basis of at least a change in the size of the figure in the inputted image;
wherein the player terminal is further caused to execute processing to control the display of the game screen, and the processing to control the display of the game screen includes disposing on the game screen a first object whose appearance changes according to a change in the size of the figure included in the inputted image in response to the recognition of the figure;
wherein the game is a game in which the player releases an item in an imaginary game space to hit a target, and the first object is configured to become smaller while rotating as the figure becomes smaller;
wherein processing to recognize the figure includes recognizing the figure of the first shape, processing to track the figure includes tracking the figure of the first shape, and processing to determine the operation input includes determining an operation input for the player to release an item on the basis of at least a change in the shape of the figure in the inputted image from the first shape to the second shape;
wherein processing to determine the operation input includes setting the strength at which the player releases the item on the basis of the difference between the size of the figure when the figure has been recognized and the size of the figure immediately before determining the operation input for the player to release the item.

11. The non-transitory computer-readable medium according to claim 10, wherein the second object is configured to rotate in the opposite direction from the direction of rotation of the first object as the figure becomes smaller.

12. The non-transitory computer-readable medium according to claim 10, wherein the at upper limit is set for the strength at which the player releases the item, and the first object is configured so that the lower the upper limit is, the faster is the speed at which the first object becomes smaller while rotating as the figure becomes smaller.

13. The non-transitory computer-readable medium according to claim 10, wherein processing to recognize the figure includes recognizing the figure of the first shape, processing to track the figure includes tracking the figure of the first shape, and processing to determine the operation input includes determining an operation input by the player on the basis of at least a change in the shape of the figure in the inputted image from the first shape to the second shape.

14. The non-transitory computer-readable medium according to claim 13, wherein processing to track the figure includes tracking an area in which the figure of the first shape is present in the inputted image, and analyzing the image within a range based on this area, thereby determining the change in the shape of the figure from the first shape to the second shape.

15. The non-transitory computer-readable medium according to claim 10, wherein processing to control the display of the game screen includes disposing on the game screen a second object that has substantially the same shape as that of the first object and is smaller than the first object when the first object is disposed, and enlarging the display of at least part of the game space included in the game screen when the first object becomes smaller and overlaps with the second object as the figure becomes smaller.

* * * * *